United States Patent [19]
Kato

[11] Patent Number: 6,067,877
[45] Date of Patent: May 30, 2000

[54] SAFETY COVER STRUCTURE FOR AUTOMATIC MACHINE

[75] Inventor: Heizaburo Kato, Ogasa-gun, Japan

[73] Assignee: Sankyo Manufacturing Co., Ltd., Tokyo, Japan

[21] Appl. No.: 08/981,153

[22] PCT Filed: May 1, 1997

[86] PCT No.: PCT/JP97/01498

§ 371 Date: Dec. 12, 1997

§ 102(e) Date: Dec. 12, 1997

[87] PCT Pub. No.: WO97/41998

PCT Pub. Date: Nov. 13, 1997

[30] Foreign Application Priority Data

May 2, 1996 [JP] Japan .................................. 8-111517
May 2, 1996 [JP] Japan .................................. 8-111518

[51] Int. Cl.[7] ........................................................ F16P 1/00
[52] U.S. Cl. ............................ 74/608; 74/609; 74/612
[58] Field of Search .................... 74/608, 609, 612, 74/613, 614, 615, 616; 150/154; 267/175

[56] References Cited

U.S. PATENT DOCUMENTS

| | | | |
|---|---|---|---|
| 3,848,721 | 11/1974 | Smit | 74/612 X |
| 4,630,431 | 12/1986 | Schlueter et al. | 74/608 X |
| 5,205,074 | 4/1993 | Guhl et al. | 267/175 X |
| 5,479,837 | 1/1996 | Kyle | 74/608 |
| 5,605,232 | 2/1997 | Bickle | 150/154 X |
| 5,640,747 | 6/1997 | Donnelly | 74/608 X |

FOREIGN PATENT DOCUMENTS

| | | | |
|---|---|---|---|
| 2702330 | 9/1994 | France | 150/154 |
| 2-53548 | 2/1990 | Japan . | |
| 4-12389 | 1/1992 | Japan . | |
| 5-72350 | 10/1993 | Japan . | |
| 8-20037 | 3/1996 | Japan . | |

*Primary Examiner*—Vinh T. Luong
*Attorney, Agent, or Firm*—Morrison & Foerster LLP

[57] ABSTRACT

A safety cover structure for covering working sections such as a drive section and an operating section of an automatic machine from the exterior so as to be capable of being opened and closed to ensure safety. The safety cover structure includes a plurality of support columns arranged in a surrounding relation to the automatic machine; a top board supported horizontally on the support columns to cover the automatic machine; a safety cover disposed vertically and movably between adjacent support columns; a connecting member having flexibility and connected to the safety cover to suspend the safety cover; grooves for guiding the connecting member from the support column to the top board; a tension arm supported horizontally on the top board so as to swing horizontally in a horizontal plane along the top board and connected with the connecting member; and an urging member connected to the tension arm to urge the tension arm in a rising direction of the safety cover. Opening the safety cover provides an open space throughout the circumference of the automatic machine which is covered by the safety cover.

17 Claims, 10 Drawing Sheets

6,067,877

SAFETY COVER STRUCTURE FOR AUTOMATIC MACHINE

TECHNICAL FIELD

The present invention relates to a safety cover structure for covering working sections such as a drive section and an operating section of an automatic machine from the outside so as to be capable of being opened and closed to ensure safety.

BACKGROUND ART

Recently, automatic machines are in wide use as labor saving machines, whereby various works are performed automatically, including loading and matching of materials, assembly and inspection of products. In such automatic machines, working sections such as a drive section and an operating section are usually covered from the outside to ensure safety.

FIG. 18 shows an example of a conventional safety cover structure, in which a safety cover 1 is supported by a support column 3 mounted centrally of an automatic machine 2 to cover working sections (not shown). The safety cover 1 is formed in the shape of a by-split box, with divided edge portions in the central part of the cover 1 being supported by the support column 3 through a hinge 4.

For opening the cover 1, it is sprung up, as shown in FIG. 18. The safety cover 1 is a so-called gull wing type cover. Various works, including inspection and servicing, for the working sections are performed from below the safety cover 1 thus opened by spring-up.

However, since the safety cover structure in such a conventional automatic machine is the gull wing type in which the front and rear portions of the safety cover 1 are sprung up with respect to the central part, both side portions are sprung up only to a slight extent although the front and rear portions are sprung up high and are opened largely. It is difficult to perform works for the working sections inside the safety cover 1 from below the side portions which are sprung up only slightly and opened only a little. Thus, there has been the problem that the working efficiency is poor.

Moreover, there always is a fear that the safety cover 1 may drop. Therefore, it is desired to think out some effective measure for preventing such drop of the cover.

DISCLOSURE OF INVENTION

The present invention has been accomplished in view of the above-mentioned conventional problem and it is an object of the invention to provide a safety cover structure for an automatic machine which cover structure can be opened large and wide sufficiently over the whole circumference of the automatic machine.

It is a further object of the present invention to provide a safety cover structure for an automatic machine which cover structure can be locked its open state automatically to ensure the safety thereof.

According to the present invention, in order to achieve the above-mentioned objects, there is provided a safety cover structure for an automatic machine, comprising a plurality of support columns arranged in a surrounding relation to the automatic machine; a top board supported by the support columns to cover the automatic machine; a safety cover disposed vertically movably between adjacent said support columns; a connecting member having flexibility and connected to the safety cover to suspend the safety cover; guide means for guiding the connecting member from the support column to the top board; a tension arm supported horizontally and pivotably by the top board and connected with the connecting member; and urging means connected to the tension arm to urge the tension arm in a rising direction of the safety cover.

Preferably, a lock mechanism for locking the safety cover in an open state and releasing the locked state with a closing motion of the safety cover is disposed between the safety cover and each said support column adjacent thereto.

Preferably, the guide means comprises first and second vertical sheaves mounted respectively to the support columns positioned on both sides of the safety cover to guide a pair of the connecting members from the vertical to the horizontal direction, the paired connecting members being connected to both sides of the safety cover; a horizontal sheave mounted to the top board in proximity to the first vertical sheave to guide horizontally one of the pair of connecting members from the first vertical sheave; and a horizontal sheave of a double structure mounted to the top board in proximity to the second vertical sheave to guide together said pair of the connecting members each from the second vertical sheave and from the horizontal sheave horizontally toward the tension arm.

Preferably, the guide means comprises first and second vertical sheaves mounted to the support columns positioned on both sides of the safety cover to guide the paired connecting members from the vertical to the horizontal direction, the paired connecting members being connected to both sides of the safety cover; a first horizontal sheave mounted to the top board in proximity to the first vertical sheave to guide horizontally one of said pair of connecting members from the first vertical sheave; a second horizontal sheave mounted to the top board in proximity to the second vertical sheave side to direct said one of the pair of connecting members from the first horizontal sheave in parallel with the safety cover and guide it horizontally toward the tension arm; and a third horizontal sheave mounted to the top board in proximity to the second vertical sheave to guide horizontally the other of said pair of connecting members from the second vertical sheave toward the tension arm.

Preferably, the lock mechanism comprises lock members attached to the safety cover in a sideways protrudable and retractable manner, the lock members being urged in the protruding direction; engaging portions formed in the support columns to engage the lock members at a raised position of the safety cover; a handle attached to the safety cover vertically movably, the handle being urged upward by means of a first spring; and unlocking means each disposed between the handle and each said lock member to allow the lock members to be retracted therein for disengagement from the engaging portions with the downward movement of the handle.

Preferably, the lock mechanism comprises a block fixed to the safety cover; a guide hole formed vertically in the block; a slide pin inserted vertically slidably into the guide hole; a handle attached to said slide pin vertically movably relative to said block; a first spring disposed between the handle and the block to urge the handle upward relative to the safety cover; a recess formed laterally in the block; a lock pin fitted in the recess slidably and capable of protruding and retracting sideways of the safety cover; a second spring disposed in the recess to urge the lock pin in its protruding direction; an engaging hole formed in the upper end of each support column to engage the lock pin protruded sideways of the safety cover; a cutout portion formed vertically in the lock pin; and a plunger provided in the handle and engaging into the cutout portion from above with a downward movement of the handle against the first spring to urge the lock pin in its retracting direction against the second spring.

Preferably, the lock mechanism comprises a block fixed to the safety cover; a guide hole formed vertically in the block; a slide pin inserted vertically slidably into the guide hole; a handle attached to the slide pin vertically movably relative to the block; a first spring disposed between the handle and the block to urge the handle upward relative to the safety cover; a recess formed laterally in the block; a lock pin fitted in the recess slidably and capable of protruding and retracting sideways of the safety cover; an engaging hole formed in the upper end of each support column to engage the lock pin protruded sideways of the safety cover; and a link disposed for connection between the lock pin and the slide pin to convert the downward movement of the slide pin with the downward movement of the handle against the first spring into a retracting movement of the lock pin.

Preferably, the biasing force of the first spring is set smaller than the urging force of the urging means which is for urging the tension arm.

Preferably, the urging means is a compression spring.

Preferably, a dead point is set for the compression spring at which dead point the compression spring extends to its maximum extent and generates a maximum urging force larger than the weight of the safety cover halfway in the movement path of the tension arm which moves pivotally from a fully closed state of the safety cover up to a fully open state thereof.

Preferably, the tension arm is mounted at a base end portion thereof to the top board pivotably through a pivot shaft, and one end of the urging means, the other end of which is supported by the top board, is connected to an intermediate portion of the tension arm, whereby a front end portion of the tension arm is urged in a direction away from the safety cover.

Preferably, a front-end portion of the tension arm is formed in an arcuate shape along the pivoting direction of tension arm so as to pull the connecting member in the pivoting direction of the tension arm.

Preferably, a plurality of such tension arms are superposed up and down and are supported by the top board pivotably through a single pivot shaft.

Preferably, the connecting member is wire.

Preferably, a groove for slidably fitting a side edge portion of the safety cover therein and for thereby guiding the vertical movement of the safety cover is formed vertically in each of the support columns.

In the safety cover structure for an automatic machine according to the present invention, which is constructed as above, safety covers are provided vertically movably each between adjacent support columns which surround the automatic machine, therefore, by raising the safety covers, the automatic machine is opened widely to a sufficient extent over the whole circumference thereof.

The safety covers are each connected, in a suspended state through the flexible connecting member, to the tension arm which is mounted horizontally to the top board. Since the rising force of each safety cover is assisted by the tension arm under the biasing force of the urging means, the safety cover is opened easily with a small and light raising force.

Moreover, since the lock mechanism for locking the safety cover in an open state and unlocking it with a closing motion of the same cover is provided between the safety cover and each of the support columns adjacent thereto, the safety cover, when opened, is locked to the support columns. Consequently, a sudden descent of the safety cover, for example caused by breaking of the connecting member, is prevented, while when the safety cover is to be closed from its open state, its locked state is released and is moved down smoothly.

Further, according to the lock mechanism constructed as above, at the raised and open position of the safety cover, the lock member capable of retractably protruding sideways of the safety cover is urged in its protruding direction into engagement with the engaging portion formed in each support column adjacent to the safety cover, whereby the open state of the safety cover is maintained.

On the other hand, for closing the safety cover, the handle is pushed down manually, with the result that the handle moves downward against the urging means and an unlocking means operates to move the lock member away from the engaging portion. Consequently, the lock member is unlocked and the safety cover becomes movable relative to the support columns. Now, the safety cover can be pushed down and closed.

Thus, the locking of the lock mechanism is performed by the safety cover opening operation and unlocking thereof is performed by the handle depressing operation for closing the safety cover. Accordingly, a series of locking and unlocking motions of the lock mechanism are carried out simply and automatically in accordance with the safety cover opening and closing operation without the need of any special operation.

BEST MODE FOR CARRYING OUT THE INVENTION

Embodiments of the present invention will be described in detail hereinafter with reference to the accompanying drawings.

Figure 1:
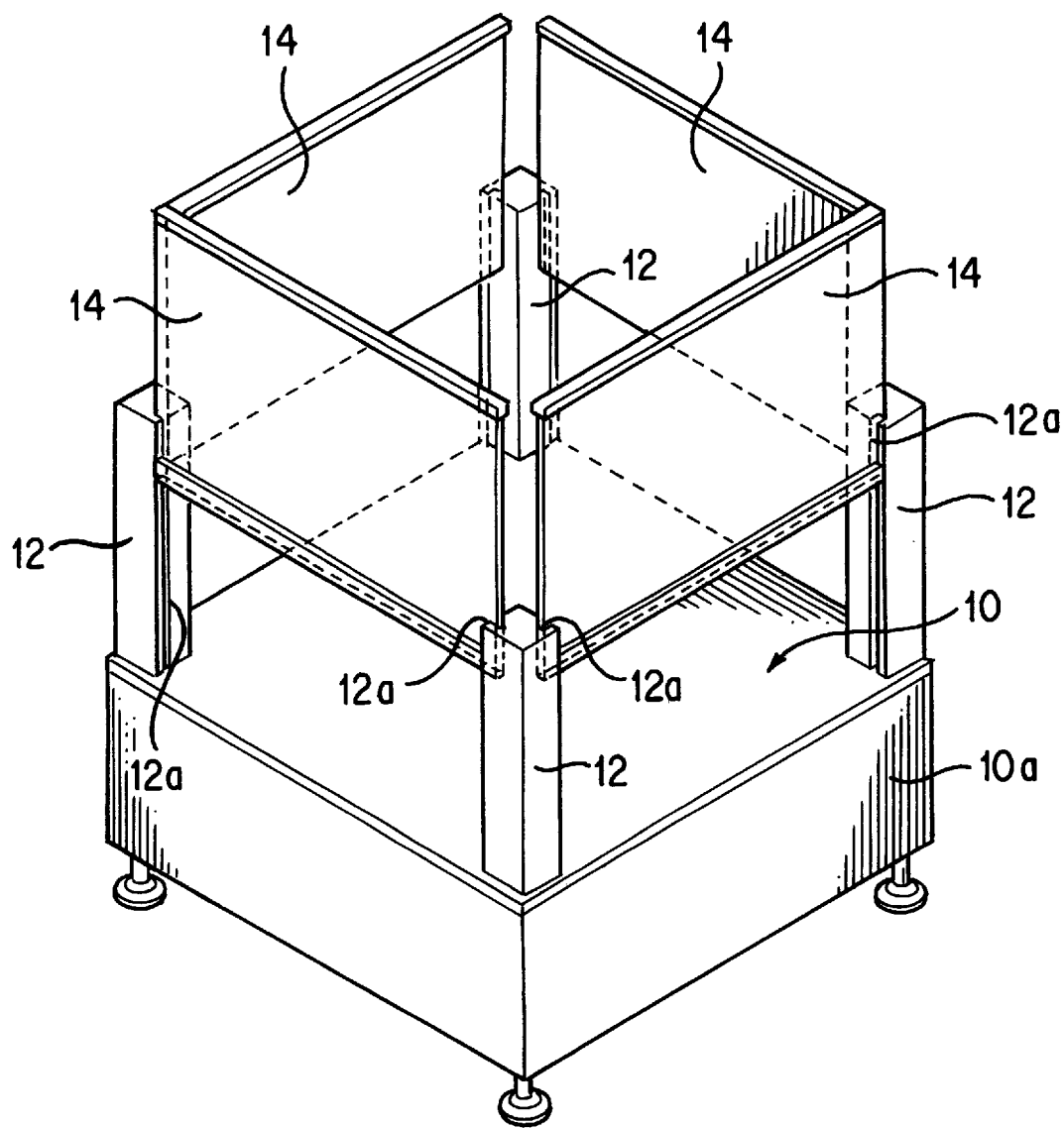
FIG. 1 is a perspective view showing the whole of a safety cover structure according to an embodiment of the present invention, with safety covers opened.
Figure 2:
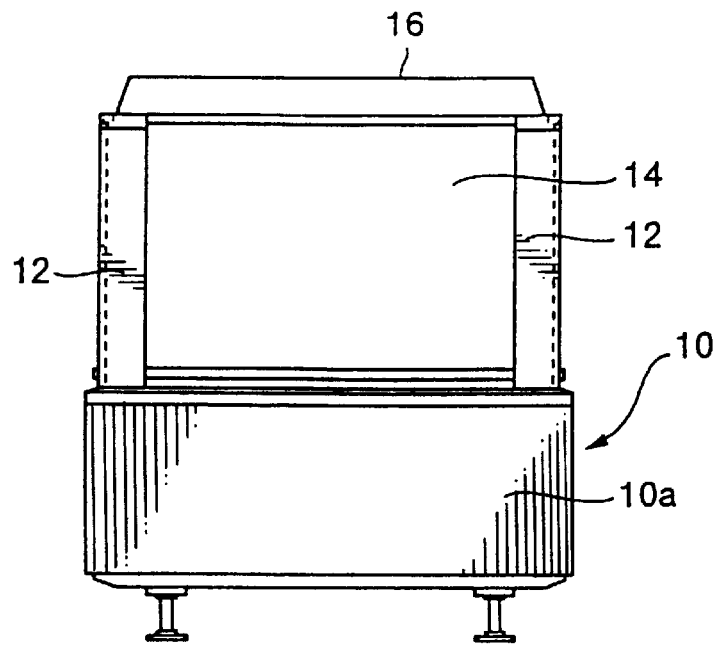
FIG. 2 is a front view of the safety cover structure, with safety covers closed.
Figure 3:
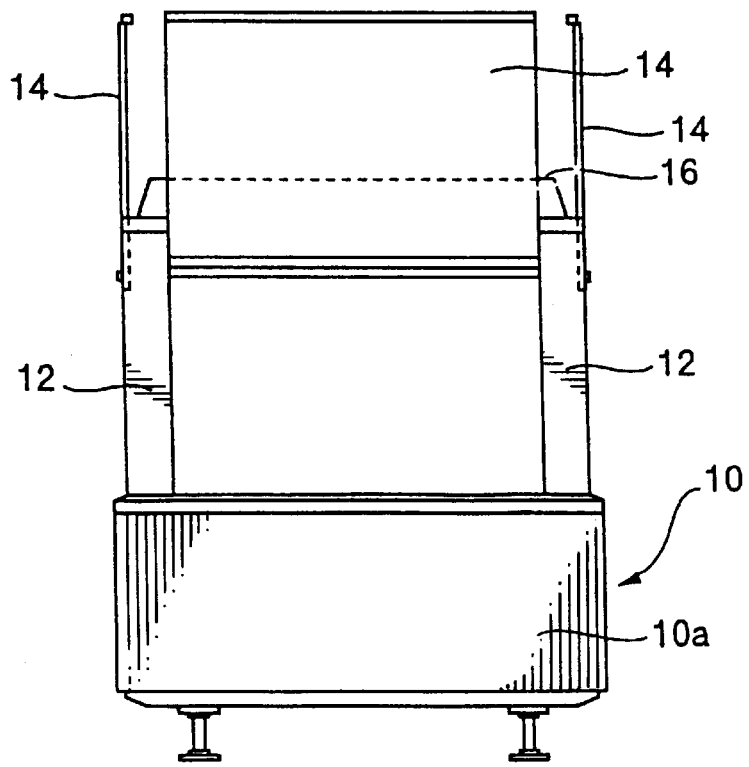
FIG. 3 is a front view of the safety cover structure, with safety covers opened.

In this embodiment, four support columns 12 are erected on upper corners of a body 10a of an automatic machine 10 which is rectangular in plan, as shown in FIGS. 1 to 3, in a surrounding relation to working sections (not shown) such as a drive section and an operating section of the automatic machine 10. In the support columns 12 are formed grooves 12a vertically so that the grooves of adjacent support columns 12 are opposed to each other. Transparent plate-like safety covers 14 are each provided between adjacent support columns 12 in such a manner that both sides of the safety cover 14 are fitted in the grooves 12a of the adjacent support columns 12 vertically slidably. Further, a top board 16 is mounted so as to straddle the inner sides of the upper ends of the support columns 12. As shown in FIG. 2, the working sections of the automatic machine 10 are covered with the top board 16 from above, and the safety covers 14 when closed cover the whole circumference of the working sections. Further, the safety covers 14 are movable vertically along the grooves 12a, so that by moving the safety covers upward, the surroundings of the working sections of the automatic machine 10 can be opened, as shown in FIG. 3.

Figure 4:
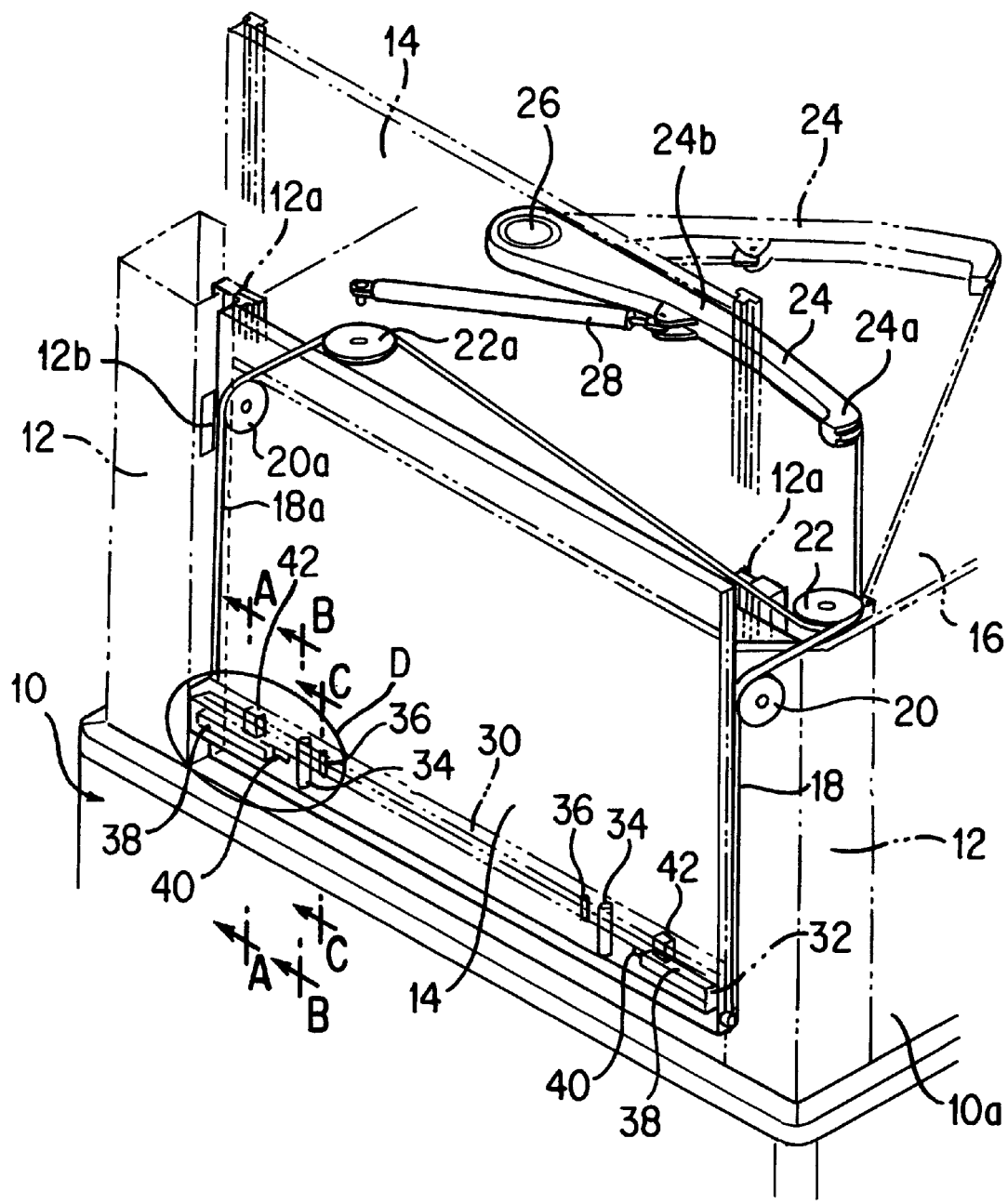
FIG. 4 is a perspective view of a mechanism for opening and closing each safety cover.
Figure 5:
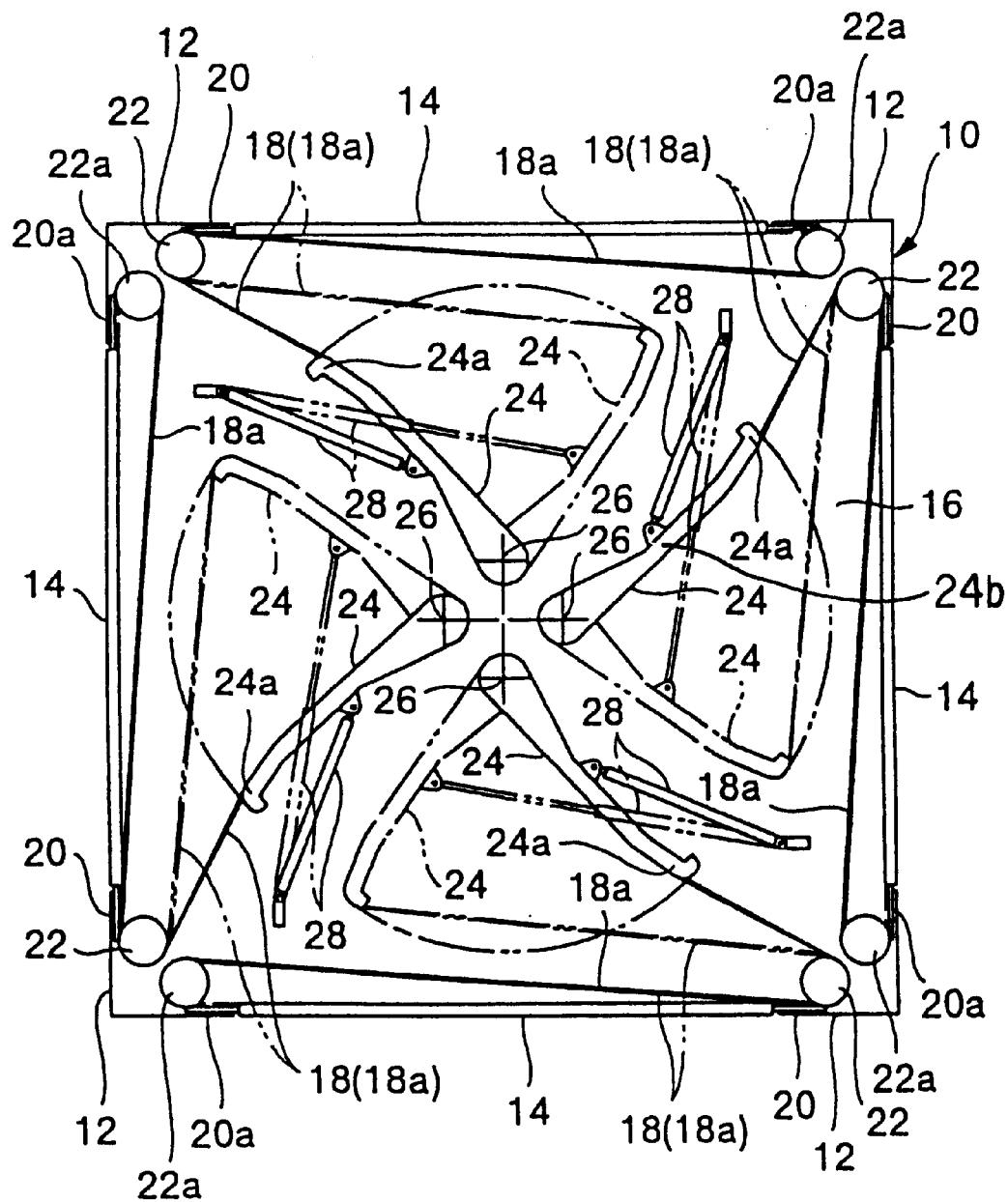
FIG. 5 is a bottom view of a lower surface of a top board provided between the upper ends of support columns.

As shown in FIGS. 4 and 5, the safety covers 14 are each suspended on both sides of its lower end portion by a pair of wires 18 and 18a. The wires 18 and 18a are entrained on vertical sheaves 20 and 20a mounted to the upper end portions of both support columns 12 adjacent to the safety cover 14 and are then entrained on horizontal sheaves or double structure 22 and 22a mounted to the lower surface of the top board 16. A tension arm 24 is mounted to the lower surface of the top board 16 pivotably at its base end portion through a pivot shaft 26. To an intermediate part of the tension arm 24 is attached one end of a compression spring 28 the other end of which is supported by the top board 16. With the compression spring 28 a front-end portion 24a of the tension arm 24b is urged in a direction away from the safety cover 14.

The horizontal sheave 22 entrained on one wire 18 has peripheral grooves formed in two upper and lower stages. The wire 18 is guided by one peripheral groove, while the other wire 18a which suspends the other side of the safety cover 14 is guided by the other peripheral groove. The paired wires 18 and 18a thus guided by the two stages of peripheral grooves are together connected to the front-end portion 24a of the tension arm 24. The front-end portion 24a of the tension arm 24 is formed in an arcuate shape to pull the wires 18 and 18a smoothly with the pivotal motion of the tension arm 24.

In this embodiment, the paired wires 18, 18a, vertical sheaves 20, 20a, horizontal sheaves 22, 22a and tension arm 24 are provided as one set for one safety cover 14. As shown in FIG. 5, the tension arms 24 provided for the safety covers 14 are mounted radially on the lower surface of the top board 16.

Figure 6:
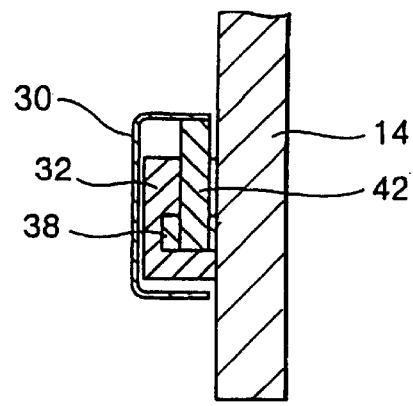
FIG. 6 is an enlarged sectional view taken on line A—A in FIG. 4.
Figure 7:
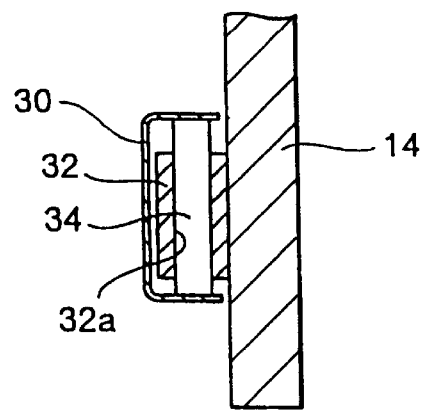
FIG. 7 is an enlarged sectional view taken on line B—B in FIG. 4.
Figure 8:
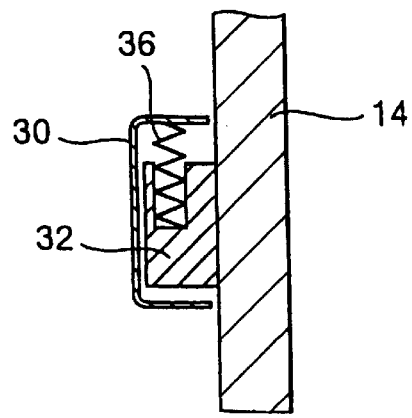
FIG. 8 is an enlarged sectional view taken on line C—C in FIG. 4.

On the other hand, the lower end portion of each safety cover 14 is provided with a handle 30 for moving the cover 14 vertically. As shown in FIGS. 6 to 8, the handle 30 is formed to have a U-shape in section and is disposed throughout the full width of the safety cover 14. The handle 30 is fitted on the outside of a block 32 through predetermined gaps in the vertical direction so as to be relatively movable slightly in the vertical direction with respect to the block 32. The block 32, which is rectangular in section, is fixed integrally to the safety cover 14.

At both end portions of the handle 30, as shown in FIG. 7, slide pins 34 are fixed between the upper and lower inner sides and are slidably fitted in guide holes 32a formed in the block 32, whereby the vertical movement of the handle 30 is guided smoothly. Further, compression springs 36 are disposed between the upper inner surface of the handle 30 and the upper surface of the block 32 to urge the handle 30 upward. The biasing force of the compression spring 36 is set smaller than that of the compression spring 28 for the tension arm 24.

Figure 9:
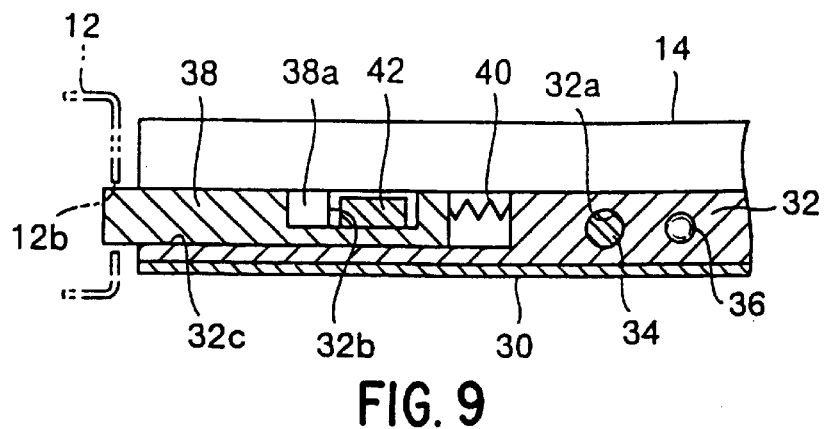
FIG. 9 is an enlarged sectional plan view of the portion D shown in FIG. 4.
Figure 10:
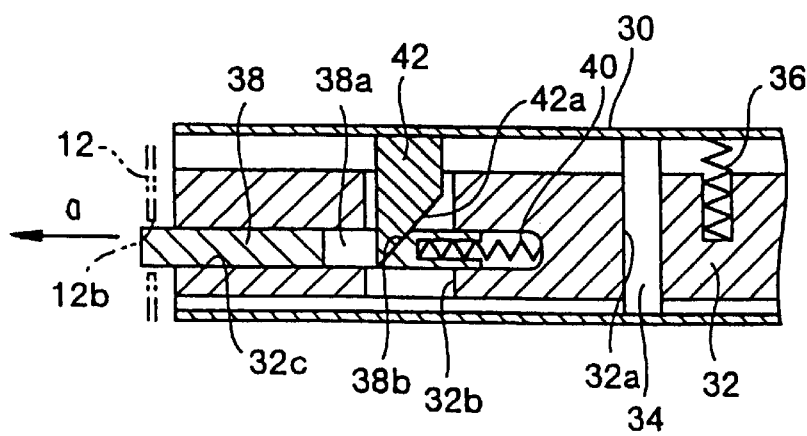
FIG. 10 is an enlarged sectional front view of the portion D in FIG. 4.
Figure 11:
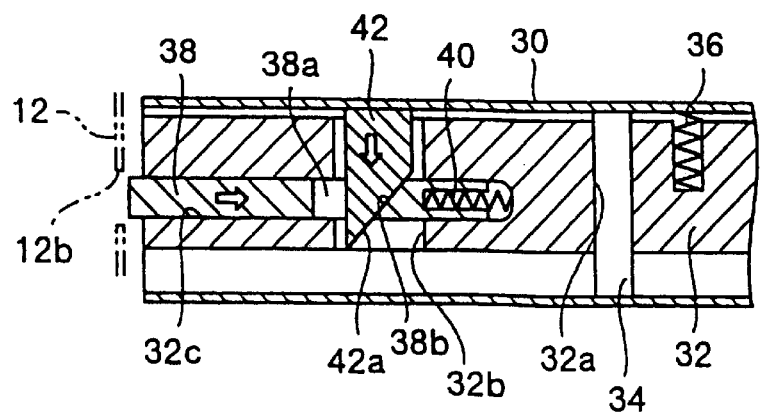
FIG. 11 is an enlarged sectional front view in an operating state corresponding to FIG. 10.

Recesses 32c extending in the longitudinal direction of the block 32 are formed in both end portions of the block 32, as shown in FIGS. 9 to 11, and a lock pin 38 which constitutes a lock mechanism is slidably fitted in each recess 32c. The front-end portion of the lock pin 38 can protrude and retract from a side end of the block 32. The lock pin 38 is urged in its protruding direction as shown by arrow α in FIG. 10 by means of a spring 40. On the other hand, in the upper end portion of each support column 12 is formed an engaging hole 12b for engagement therein of the front-end portion of the lock pin 38. When the safety covers 14 are open, that is, when they are raised to their highest positions, the lock pins 38 are engaged with the engaging holes 12b.

Centrally of each lock pin 38 is formed a cutout portion 38a extending vertically through the lock pin 38, as shown in FIG. 9. A side face on the rear side (the right side in the FIG. 9) of the cutout portion 38a is formed as an inclined surface 38b which is inclined forward (leftward in the FIG. 9) gradually from the upper to the lower side.

In the block 32, as shown in FIG. 10, is formed a vertical through hole 32b correspondingly to the cutout portion 38a of the lock pin 38, and a plunger 42 is suspended from the upper inner surface of the handle 30 and is inserted into the through hole 32b. On the rear side of the lower end portion of the plunger 42 is formed an inclined surface 42a along the inclined surface 38b. Both inclined surfaces 38b and 42a are abutted each other slidably. When the handle 30 is held at its upper position by the springs 36, the plunger 42 is raised and each lock pin 38 is protruded by virtue of the spring 40.

In the safety cover structure for an automatic machine according to this embodiment constructed as above, four support columns 12 are erected on the upper surface of the automatic machine body 10a in a surrounding relation to the working sections of the automatic machine 10, safety covers 14 are each disposed between adjacent support columns 12 in a vertically movable manner, and the top board 16 is provided so as to straddle the insides of the upper end portions of the safety covers 14 and the support columns 12. The working sections of the automatic machine 10 are surrounded thereby. By raising the safety covers 14 along the support columns 12 in performing various operations such as inspection and maintenance of the working sections, the safety covers 14 can be opened sufficiently widely throughout the whole circumference of the automatic machine 10 only except the support columns 12. Thus, various operations for the working sections of the automatic machine 10 can be done freely and easily in all directions, whereby it is possible to greatly improve the working efficiency.

Further, since the tension arms 24 for driving the safety covers 14 which are each moved vertically between adjacent support columns 12 are arranged horizontally and the transfer of the driving force between the tension arms 24 and the safety covers 14 is performed by the flexible wires 18 and 18a, such a planar arrangement of the tension arms 24 permits the tension arms 24 to be mounted thin and compact. Besides, although the safety covers 14 are moved vertically around the automatic machine 10, there is no obstacle around the automatic machine 10 only except the support columns 12, and therefore the vertically movable safety covers 14 can be installed on the automatic machine 10 efficiently at a waste-less layout.

For opening the safety covers 14 the handle 30 provided at the lower end portion of each safety cover 14 is pushed upward manually. In this case, the wires 18 and 18a mounted on both sides of each safety cover 14 are guided upward and connected to the tension arm 24, so that the biasing force of the compression spring 28 attached to the tension arm 24 acts as an auxiliary force for raising the safety cover 14. Thus, the safety covers 14 can be raised with a small operating force.

Particularly, the compression spring 28 connected at one end thereof to the top board 16 and connected at the other end to the tension arm 24 may have a so-called dead point at which the compression spring 28 is extended to its maximum extent and generates a maximum biasing force larger than the weight of each safety cover 14 halfway in the movement path of the tension arm 24 which pivotally moves from the fully closed state of the safety cover 14 up to its fully open state. In this case, centered at the dead point position, a biasing force acting to pull up the safety cover 14 is exerted continually on the tension arm 24 from the compression spring 28. Consequently, when the safety cover 14 is in its upwardly pulled-up state, this open state of the safety cover 14 can be maintained firmly with the biasing force of the compression spring 28 larger than the weight of the safety cover 14. On the other hand, with the safety cover 14 pulled down, this closed state of the safety cover 14 is maintained, and even in this closed state the biasing force acting to raise the safety cover 14 continues to operate on the tension arm 24 from the compression spring 28. In pulling up the safety cover 14, this biasing force serves as an auxiliary force, whereby the safety cover 14 can be pushed up lightly with a small force.

When each safety cover 14 is opened up to the top end of the support columns 12 adjacent thereto, the lock pins 38 provided at both end portions of the block 32 are engaged with engaging holes 12b formed in the support columns 12. Thus, even in the event of occurrence of any trouble such as breaking of the wires 18 and 18a, the opened safety cover 14 is prevented from sudden drop and it is possible to ensure safety.

When the handle 30 is pushed down to close the safety cover 14 from its open state, the handle 30 moves downward relative to the block 32 against the biasing force of the spring 36. In this connection, since the biasing force of the spring 36 is set smaller than that of the compression spring 28 for the tension arm 24 which is for suspending the safety cover 14, it is possible to depress only the handle 30 without descent of the safety cover 14. Consequently, as shown in FIG. 11, the plunger 42 moves downward and its inclined surface 42a formed at the lower end portion thereof presses the inclined surface 38b of the lock pin 38, causing the lock pin 38 to retract backward against the biasing force of the spring 40. Consequently, the lock pin 38 becomes disengaged from the associated engaging hole 12b formed in the support column 12 and the safety cover 14 becomes movable. Now, the safety cover 14 can be pulled down and closed easily.

Thus, in this embodiment, the engagement of the lock pin 38 with the engaging hole 12b is performed by the opening motion of the safety cover 14 and the disengagement thereof from the engaging hole 12b is attained by depression of the handle 30 to close the safety cover 14. In this way, without the need of any special operation, a series of operations of the lock pin 38 can be done automatically in accordance with the usual opening and closing operation of the safety cover 14.

Figure 12:
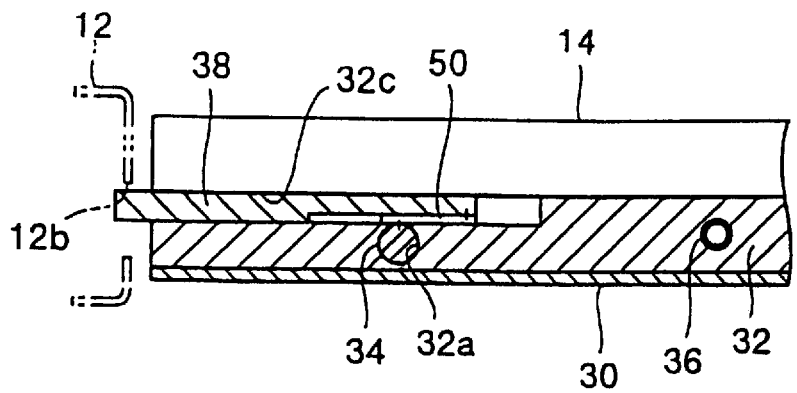
FIG. 12 is an enlarged sectional plan view corresponding to FIG. 9, showing another embodiment of the present invention.
Figure 13:
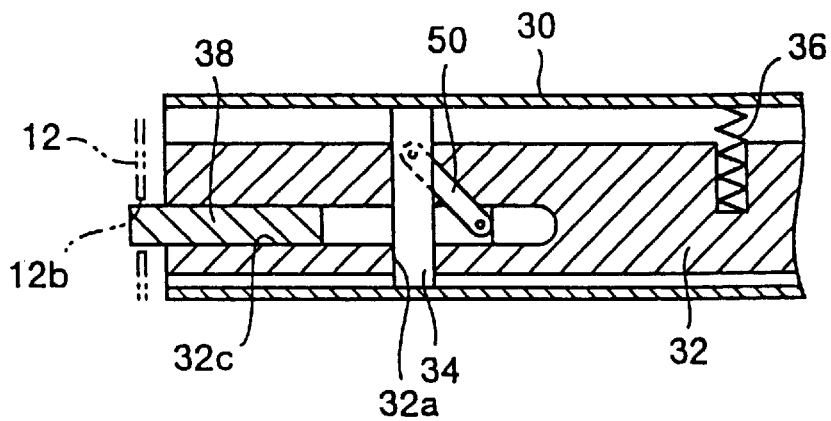
FIG. 13 is an enlarged sectional front view in the another embodiment, corresponding to FIG. 10.
Figure 14:
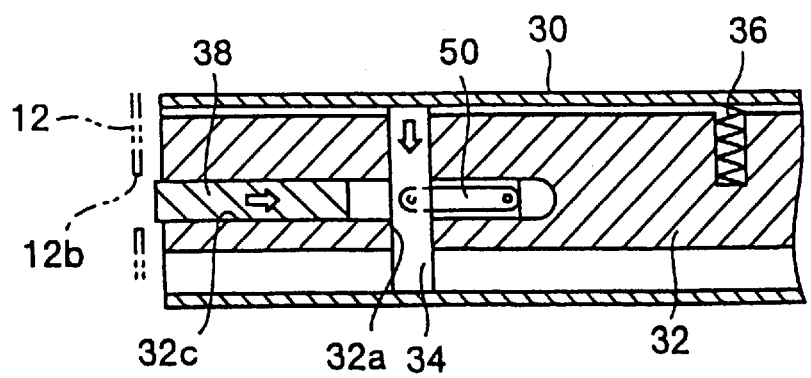
FIG. 14 is an enlarged sectional front view in the another embodiment, corresponding to FIG. 11.

FIGS. 12 to 14 illustrate another embodiment of the present invention, in which the same components as in the previous embodiment are indicated by the same reference numerals as in the previous embodiment to omit the repeated explanations.

This embodiment shows another example of an operating mechanism for each lock pin 38. As illustrated in FIGS. 12 and 13, a link 50 is mounted obliquely between a slide pin 34 and the rear end of the lock pin 38.

In this embodiment, therefore, when a handle 30 is raised with the biasing force of a compression spring 36, the slide pin 34 assumes an upper position relative to a block 32 and the link 50 is positioned obliquely, allowing the lock pin 38 to be protruded. In this state, the lock pin 38 comes into engagement with an engaging hole 12b formed in a support column 12 to prevent sudden drop of a safety cover 14. The lock pin 38 is urged in its protruding direction at all times by virtue of the compression spring 36 which acts to raise the handle 30.

On the other hand, for closing the safety cover 14, when the handle 30 is pushed down against the biasing force of the compression spring 36, as shown in FIG. 14, the slide pin 34 moves downward relative to the block 32, so that the link 50 turns in the horizontal direction, thus permitting the lock pin 38 to be retracted. In this way it becomes possible to disengage the lock pin 38 from the engaging hole 12b and move the safety cover 14.

Figure 15:
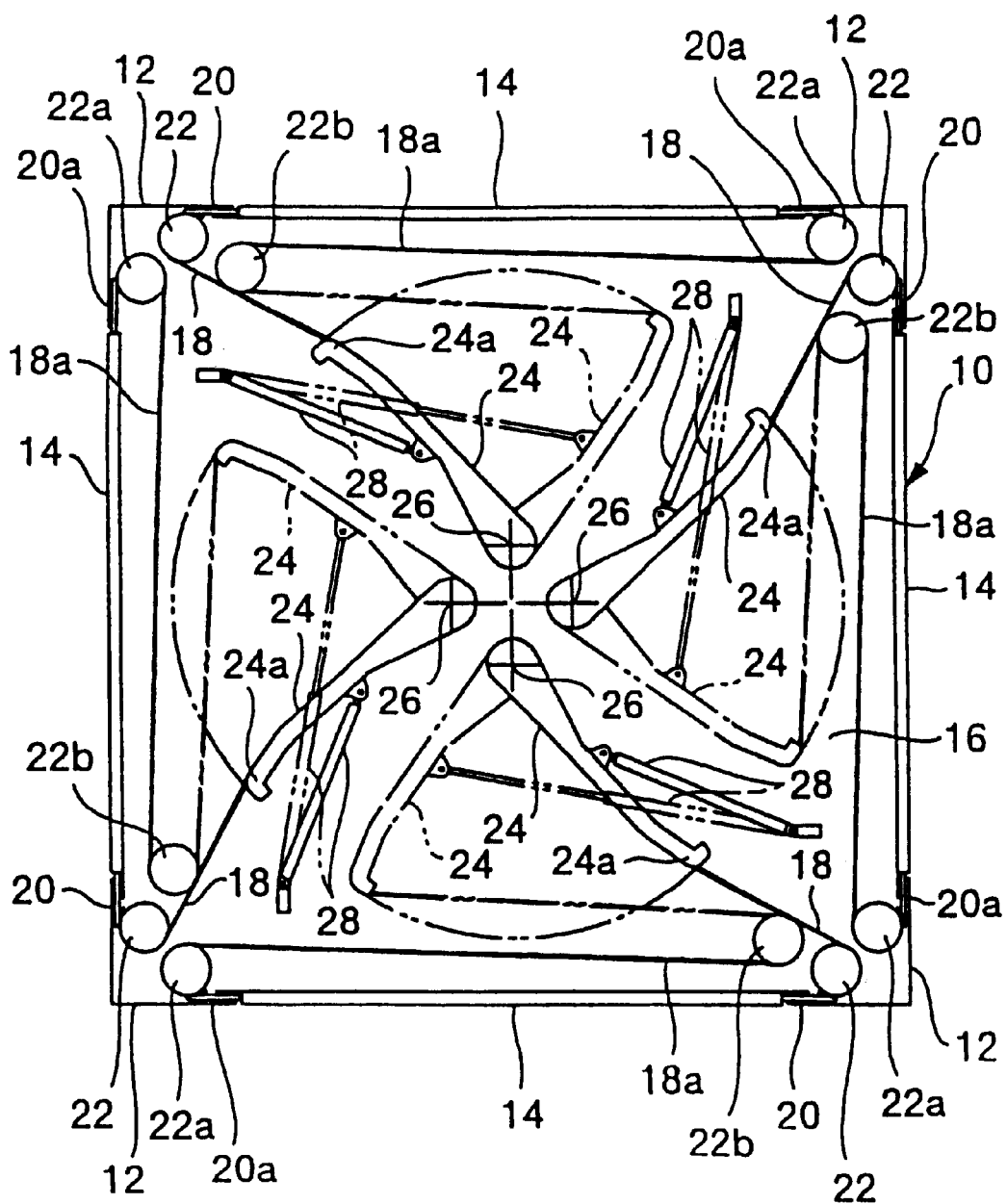
FIG. 15 is a bottom view corresponding to FIG. 5, showing a further embodiment of the present invention.

FIG. 15 illustrates a further embodiment of the present invention, in which the same components as in the previous embodiments are indicated by the same reference numerals as in the previous embodiments to omit repeated explanations.

In this embodiment, as in the previous embodiments, tension arms 24 are arranged radially on the lower surface of a top board 16, provided one additional horizontal sheave is provided for guiding wires 18 and 18a which are connected to the tension arms 24. More specifically, in the previous embodiments, as shown in FIG. 5, the horizontal sheave 22 with wire 18 entrained thereon is also used for entrainment of the wire 18a thereon after entrained on the horizontal sheave 22a, while in this embodiment, an additional horizontal sheave 22b is disposed near the horizontal sheave 22 and the wire 18a is entrained on the horizontal sheave 22b, thereby permitting the wire 18a to be laid substantially in parallel with the safety cover 14.

Figure 16:
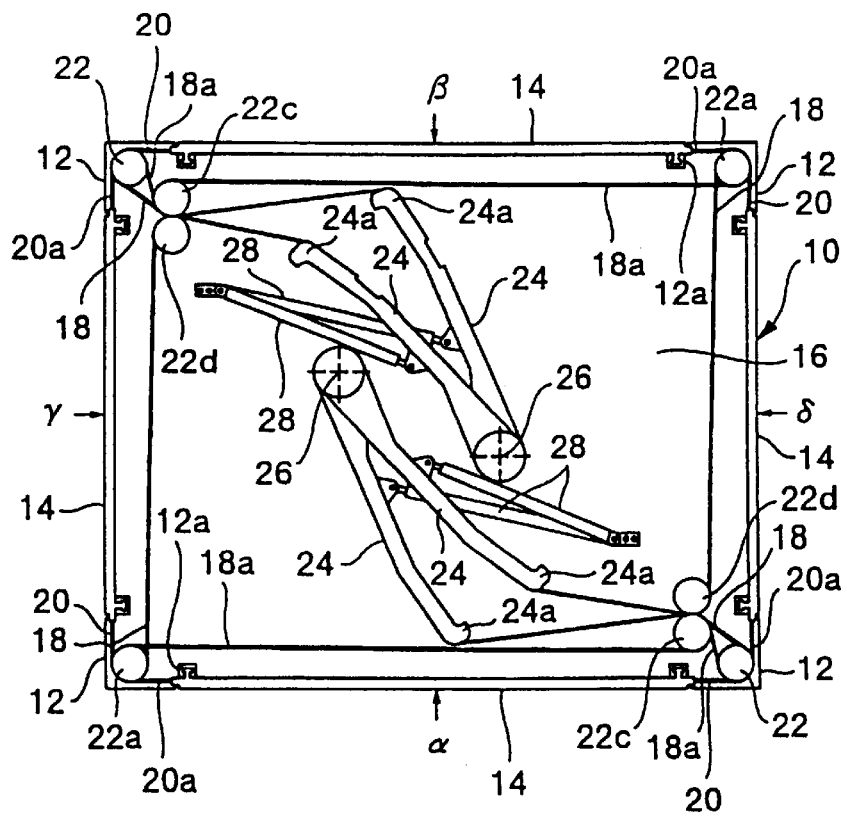
FIG. 16 is a bottom view corresponding to FIG. 5, showing a still further embodiment of the present invention.
Figure 17:
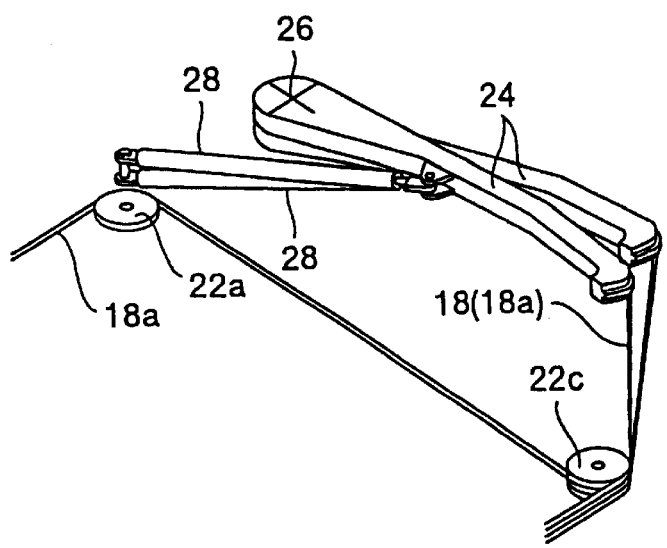
FIG. 17 is a perspective view of a tension arm used therein.
Figure 18:
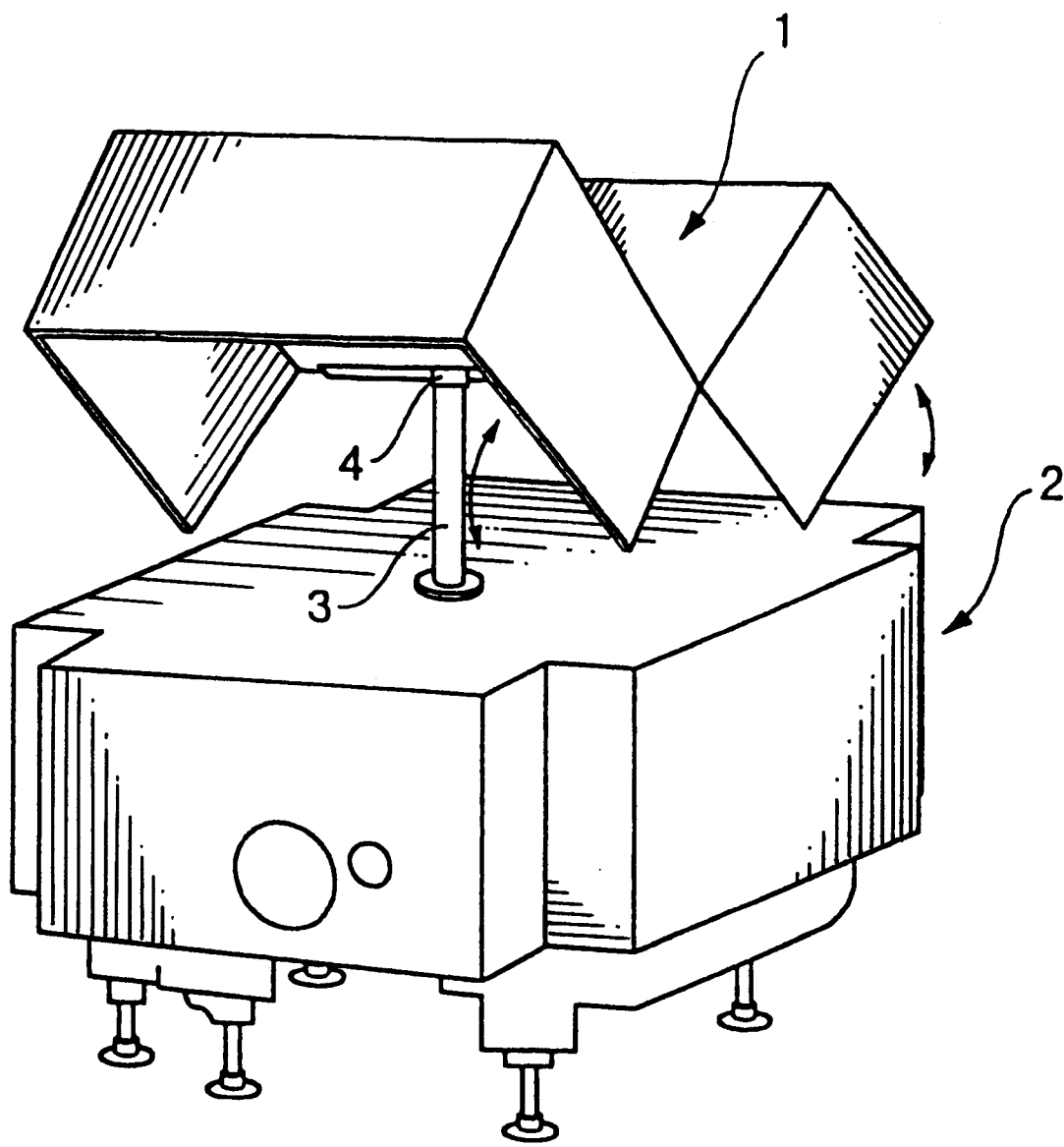
FIG. 18 is a perspective view showing a conventional safety cover structure for an automatic machine.

FIGS. 16 and 17 illustrate a still further embodiment, in which the same components as in the previous embodiments are indicated by the same reference numerals to omit the repeated explanations.

In this embodiment, two adjacent tension arms 24 are superimposed one on the other using a pivot shaft 26 as a common shaft and are mounted in a bifurcated shape to a top board 16. In each of safety covers 14 disposed on front side α and rear side β, one wire 18 is entrained on a vertical sheave 20 and a horizontal sheave 22, then is entrained on a horizontal sheave 22c disposed near the horizontal sheave 22, and is connected to one tension arm 24. The other wire 18a is entrained on a vertical sheave 20a and a horizontal sheave 22a, then is entrained on the horizontal sheave 22c and is connected to the aforesaid tension arm 24.

On the other hand, in each of safety covers 14 disposed on left side γ and right side δ, one wire 18 is entrained on a vertical sheave 20 and the aforesaid horizontal sheave 22a, then extends across the top board 16 and is entrained on a horizontal sheave 22d disposed in proximity to the horizontal sheave 22c and is connected to the other tension arm 24. The other wire 18a is entrained on a vertical sheave 20a and the aforesaid horizontal sheave 22, then is entrained on the horizontal sheave 22c and is connected with the said tension arm 24. Compression springs 28, 28 are connected separately to the bifurcated tension arms 24 and 24.

According to this embodiment, not only the same functions as in the previous embodiments can be exhibited but also the layout of tension arms 24 for the top board 16 can be facilitated because two adjacent tension arms 24 are arranged bifurcately up and down.

As set forth above, according to the safety cover structure in one aspect of the present invention, since safety covers are provided vertically movably each between adjacent support columns in a surrounding relation to an automatic machine, a sufficiently wide open space can be ensured throughout the whole circumference of the automatic machine by raising the safety covers. Consequently, various operations can be performed for the automatic machine freely and easily in all directions.

The safety covers are each connected in a suspended state to a horizontally disposed tension arm through a flexible-connecting member. Since the safety cover raising force can be assisted with this tension arm under the action of an urging means, the safety cover can be easily opened lightly with a small force.

Moreover, since the tension arm for driving the safety cover moved vertically between support columns is disposed horizontally and the transfer of the driving force between the tension arm and the safety cover is performed by a flexible connecting member, not only the tension arm and the urging means which constitute a drive mechanism can be constructed thin and compact in such a planar arrangement thereof, but also although the safety covers are driven vertically around the automatic machine there is no obstacle around the same machine only except the support columns. Thus, vertically movable safety covers can be installed on the automatic machine efficiently at a waste-less layout.

According to the safety cover structure in another aspect of the present invention, since a lock mechanism capable of locking each safety cover in an open state of the cover and releasing the locked state with a closing motion of the safety cover is disposed between the safety cover and support columns adjacent thereto, the safety cover when opened is locked to the support columns by the lock mechanism, whereby sudden drop of the safety cover caused, for example, by breaking of the connecting member can be prevented and thus a great improvement of safety can be attained. Besides, when the safety cover is to be closed from its open state, the safety cover is released its locked state and can be moved down smoothly.

According to the safety cover structure in a further aspect of the present invention, in the raised and opened position of each safety cover, lock members capable of retractably protruding sideways of the safety cover are urged in the protruding direction thereof and come into engagement with engaging portions formed in support columns, whereby the safety cover can be held in its open condition. With the lock members, the safety cover is sure to be prevented its descent and hence can be prevented from sudden drop, whereby safety can be improved to a great extent.

In closing the safety cover, by depressing its handle manually, the handle moves downward against the urging means to operate an unlock mechanism, whereby the lock members are disengaged from the aforesaid engaging portions to release its locked state. Now, the safety cover is movable relative to the support columns and thus can be depressed into its closed state.

Thus, the locking of the lock mechanism is performed by the opening motion of the safety cover and unlocking thereof is effected by the handle depressing operation in closing the safety cover. Accordingly, a series of locking and unlocking operations of the lock mechanism can be done simply and automatically in accordance with the safety cover opening and closing operation.

What is claimed is:

1. A safety cover structure for an automatic machine, comprising:

a plurality of support columns arranged in a surrounding relation to the automatic machine;

a top board supported horizontally on said support columns to cover the automatic machine;

a safety cover disposed vertically movably between adjacent support columns;

a connecting member having flexibility and connected to said safety cover to suspend the safety cover;

guide means for guiding said connecting member from the support column to the top board;

a tension arm supported horizontally on said top board so as to swing horizontally in a horizontal plane along said top board and connected with said connecting member; and urging means connected to said tension arm to urge the tension arm in a rising direction of the safety cover.

2. A safety cover structure for an automatic machine according to claim 1, wherein a lock mechanism for locking said safety cover in an open state and releasing the locked state with a closing motion of the safety cover is disposed between the safety cover and each said support column adjacent thereto.

3. A safety cover structure for an automatic machine according to claim 2, wherein said lock mechanism comprises:

lock members attached to said safety cover in a sideways protrudable and retractable manner, said lock members being urged in a protruding direction;

engaging portions formed in said support columns to engage said lock members at a raised position of the safety cover;

a handle attached to the safety cover vertically movably, said handle being urged upward by means of a first spring; and an unlocking mechanism each disposed between said handle and each said lock member to allow the lock members to be retracted therein for disengagement from said engaging portions with the downward movement of the handle.

4. A safety cover structure for an automatic machine according to claim 3, wherein the biasing force of said first spring is set smaller than the urging force of said urging means which is for urging said tension arm.

5. A safety cover structure for an automatic machine according to claim 2, wherein said lock mechanism comprises:
- a block fixed to said safety cover;
- a guide hole formed vertically in said block;
- a slide pin inserted vertically slidably into said guide hole;
- a handle attached to said slide pin vertically and movably relative to said block;
- a first spring disposed between said handle and said block to urge the handle upward relative to said safety cover;
- a recess formed laterally in said block;
- a lock pin fitted in said recess slidably and capable of protruding and retracting sideways of said safety cover;
- a second spring disposed in said recess to urge said lock pin in its protruding direction;
- an engaging hole formed in the upper end of each said support column engage said lock pin protruded sideways of the safety cover;
- a cutout portion formed vertically in said lock pin; and
- a plunger provided in said handle and engaging into said cutout portion from above with a downward movement of said handle against said first spring to urge said lock pin in its retracting direction against said second spring.

6. A safety cover structure for an automatic machine according to claim 5, wherein the biasing force of said first spring is set smaller than the urging force of said urging means which is for urging said tension arm.

7. A safety cover structure for an automatic machine according to claim 2, wherein said lock mechanism comprises:
- a block fixed to said safety cover;
- a guide hole formed vertically in said block;
- a slide pin inserted vertically slidably into said guide hole;
- a handle attached to said slide pin vertically movably relative to said block;
- a first spring disposed between said handle and said block to urge the handle upward relative to said safety cover;
- a recess formed laterally in said block;
- a lock pin fitted in said recess slidably and capable of protruding and retracting sideways of the safety cover;
- an engaging hole formed in the upper end of each said support column to engage said lock pin protruded sideways of the safety cover; and
- a link disposed for connection between said lock pin and said slide pin to convert the downward movement of the slide pin with the downward movement of said handle against said first spring into a retracting movement of the lock pin.

8. A safety cover structure for an automatic machine according to claim 7, wherein the biasing force of said first spring is set smaller than the urging force of said urging means which is for urging said tension arm.

9. A safety cover structure for an automatic machine according to claim 1, wherein said guide means comprises:
- first and second vertical sheaves mounted respectively to said support columns positioned on both sides of said safety cover to guide a pair of said connecting members from the vertical to the horizontal direction, said paired connecting members being connected to both sides of the safety cover;
- a horizontal sheave mounted to said top board in proximity to said first vertical sheave to guide horizontally one of said pair of connecting members from the first vertical sheave; and
- a horizontal sheave of a double structure mounted to said top board in proximity to said second vertical sheave to guide together said pair of connecting members each from the second vertical sheave and the horizontal sheave horizontally toward said tension arm.

10. A safety cover structure according to claim 1, wherein said guide means comprises:
- first and second vertical sheaves mounted to said support columns positioned on both sides of said safety cover to guide the paired connecting members from the vertical to the horizontal direction, said paired connecting members being connected to both sides of the safety cover;
- a first horizontal sheave mounted to said top board in proximity to said first vertical sheave to guide horizontally one of said pair of connecting members from the first vertical sheave;
- a second horizontal sheave mounted to said top board in proximity to said second vertical sheave side to direct said one of the pair of connecting members from the first horizontal sheave in parallel with said safety cover and guide it horizontally toward said tension arm; and
- a third horizontal sheave mounted to said top board in proximity to said second vertical sheave to guide horizontally the other of said pair of connecting members from the second vertical sheave toward said tension arm.

11. A safety cover structure for an automatic machine according to claim 1, wherein said urging means is a compression spring.

12. A safety cover structure for an automatic machine according to claim 11, wherein a dead point is set for said compression spring at which dead point the compression spring extends to its maximum extent and generates a maximum urging force larger than the weight of said safety cover halfway in the movement path of said tension arm which moves pivotally from a fully closed state of the safety cover up to a fully open state thereof.

13. A safety cover structure for an automatic machine, according to claim 1, wherein said tension arm is mounted at a base end portion thereof to said top board pivotably through a pivot shaft, and one end of said urging means, the other end of which is supported by the top board, is connected to an intermediate portion of said tension arm, whereby a front end portion of the tension arm is urged in a direction away from the safety cover.

14. A safety cover structure for an automatic machine according to claim 1, wherein a front end portion of said tension arm is formed in an arcuate shape along the pivoting direction of tension arm so as to pull said connecting member in the pivoting direction of the tension arm.

15. A safety cover structure for an automatic machine according to claim 1, wherein a plurality of said tension arms are superposed up and down and are supported by said top board pivotably through a single pivot shaft.

16. A safety cover structure for an automatic machine according to claim 1, wherein said connecting member is wire.

17. A safety cover structure for an automatic machine according to claim 1, wherein a groove for slidably fitting a side edge portion of said safety cover therein and for thereby guiding the vertical movement of the safety cover is formed vertically in each of said support columns.

* * * * *